US012104932B2

(12) United States Patent
Ohno et al.

(10) Patent No.: US 12,104,932 B2
(45) Date of Patent: Oct. 1, 2024

(54) ENCODER AND DRIVE DEVICE

(71) Applicant: NIKON CORPORATION, Tokyo (JP)

(72) Inventors: Kou Ohno, Sendai (JP); Hiroyuki Kishida, Yachiyo (JP)

(73) Assignee: NIKON CORPORATION, Tokyo (JP)

( * ) Notice: Subject to any disclaimer, the term of this patent is extended or adjusted under 35 U.S.C. 154(b) by 1174 days.

(21) Appl. No.: 16/630,881

(22) PCT Filed: Jul. 10, 2018

(86) PCT No.: PCT/JP2018/026034
§ 371 (c)(1),
(2) Date: Mar. 6, 2020

(87) PCT Pub. No.: WO2019/013206
PCT Pub. Date: Jan. 17, 2019

(65) Prior Publication Data
US 2022/0349731 A1 Nov. 3, 2022

(30) Foreign Application Priority Data
Jul. 14, 2017 (JP) .................................. 2017-137860

(51) Int. Cl.
*G01D 5/244* (2006.01)

(52) U.S. Cl.
CPC ...... *G01D 5/24438* (2013.01); *G01D 5/24442* (2013.01)

(58) Field of Classification Search
CPC .. G01D 3/028; G01D 5/3473; G01D 5/24438; G01D 5/24442; G01D 2205/20; G04C 5/00; H02K 49/102

(Continued)

(56) References Cited

U.S. PATENT DOCUMENTS 6,637,118 B2 * 10/2003 Feichtinger .......... G01D 5/3473
33/1 PT
7,141,965 B2 * 11/2006 Breuer ................... G01D 5/145
324/252

(Continued)

FOREIGN PATENT DOCUMENTS

CN 101929834 A * 12/2010 ............. G01D 5/145
CN 103376123 A * 10/2013 ......... G01D 5/34707

(Continued)

OTHER PUBLICATIONS

English Translation of CN 103683681 A (Year: 2014).*

(Continued)

*Primary Examiner* — Alesa Allgood
(74) *Attorney, Agent, or Firm* — Oliff PLC

(57) ABSTRACT

An encoder for detecting rotation information of a first rotation shaft includes a first detector which detects a pattern provided in the first rotation shaft, a first housing case which houses the pattern provided in the first rotation shaft and the first detector, a second housing case which houses at least a part of a shaft portion different from a portion where the pattern is provided, of the first rotation shaft, and an adjusting mechanism which adjusts at least one of an atmospheric pressure and a temperature in the first housing case to be higher than at least one of an atmospheric pressure and a temperature in the second housing case. The inflow of the high-humidity air from a motor into the encoder is prevented or suppressed, so that the condensation in the encoder can be prevented or suppressed.

23 Claims, 7 Drawing Sheets

(58) Field of Classification Search
USPC .................. 324/207.23, 207.25; 74/490.03; 310/68 B
See application file for complete search history.

(56) References Cited

U.S. PATENT DOCUMENTS

| | | | | |
|---|---|---|---|---|
| 7,196,527 | B2* | 3/2007 | Stridsberg | G01D 5/2415 324/662 |
| 7,405,556 | B2* | 7/2008 | Breuer | G01D 5/145 324/252 |
| 7,965,004 | B2* | 6/2011 | Hornberger | H02K 29/08 310/68 B |
| 8,441,252 | B2* | 5/2013 | Suzuki | G01D 5/145 324/207.21 |
| 8,471,552 | B2* | 6/2013 | Suzuki | G01D 5/145 324/207.21 |
| 9,329,058 | B2* | 5/2016 | Horiguchi | G02B 7/04 |
| 9,534,931 | B2* | 1/2017 | Ueda | B25J 19/02 |
| 9,651,405 | B1* | 5/2017 | Gowreesunker | G01D 5/34776 |
| 9,797,753 | B1* | 10/2017 | Gowreesunker | G01B 11/26 |
| 10,302,465 | B2* | 5/2019 | Gowreesunker | G01D 5/3473 |
| 2005/0116705 | A1* | 6/2005 | Breuer | G01D 5/145 324/207.21 |
| 2005/0270040 | A1* | 12/2005 | Stridsberg | G01D 5/2415 324/662 |
| 2009/0230824 | A1* | 9/2009 | Hornberger | G01D 5/145 310/68 B |
| 2010/0019135 | A1* | 1/2010 | Eckert | H02K 11/22 250/231.13 |
| 2010/0321006 | A1* | 12/2010 | Suzuki | H02K 11/215 324/207.25 |
| 2011/0115477 | A1* | 5/2011 | Suzuki | G01D 5/145 324/207.21 |
| 2015/0053040 | A1* | 2/2015 | Ueda | H02K 11/21 310/68 B |
| 2015/0367659 | A1* | 12/2015 | Katerberg | B41J 2/2135 347/16 |
| 2017/0077777 | A1* | 3/2017 | Nam | H02K 5/132 |
| 2017/0248446 | A1* | 8/2017 | Gowreesunker | G05G 9/047 |
| 2022/0349731 | A1* | 11/2022 | Ohno | G01D 5/24438 |

FOREIGN PATENT DOCUMENTS

| | | | | |
|---|---|---|---|---|
| CN | 103683681 | A * | 3/2014 | ............ G01D 5/145 |
| CN | 103906997 | A * | 7/2014 | ........... B62D 5/0481 |
| CN | 104204731 | A * | 12/2014 | ............. B25J 19/02 |
| CN | 109791058 | B * | 4/2022 | ............ G01D 18/00 |
| DE | 102006041056 | A1 * | 3/2008 | ............ G01D 21/02 |
| DE | 102016007722 | A1 * | 1/2017 | ........... G01D 11/245 |
| DE | 102016115624 | A1 * | 3/2018 | ............ G01D 18/00 |
| EP | 2703783 | A2 * | 3/2014 | ............ G01D 5/145 |
| EP | 4163601 | A1 * | 4/2023 | ........... G01D 18/001 |
| JP | S64-88117 | A | 4/1989 | |
| JP | H0376115 | U * | 7/1991 | |
| JP | H05-322597 | A | 12/1993 | |
| JP | H08201414 | A * | 8/1996 | |
| JP | 2004198179 | A * | 7/2004 | |
| JP | 2006136160 | A * | 5/2006 | |
| JP | 2010004695 | A * | 1/2010 | |
| JP | 2010501870 | A * | 1/2010 | |
| JP | 2011-2311 | A | 1/2011 | |
| JP | 2011002311 | A * | 1/2011 | ............ G01D 5/145 |
| JP | 5314945 | B2 * | 10/2013 | |
| JP | 2015-105602 | A | 6/2015 | |
| JP | 2016070668 | A * | 5/2016 | |
| JP | 2017-15521 | A | 1/2017 | |
| JP | 6404988 | B1 * | 10/2018 | ........... G01D 11/245 |
| JP | 2020056742 | A * | 4/2020 | |
| JP | 3228242 | U * | 10/2020 | ............ G01D 18/00 |
| JP | 6847905 | B2 * | 3/2021 | ................ F16B 2/18 |
| JP | 7121341 | B2 * | 8/2022 | |
| KR | 20120093005 | A * | 8/2012 | |
| WO | WO-2008025681 | A1 * | 3/2008 | ............ G01D 21/02 |
| WO | WO-2013002103 | A1 * | 1/2013 | ................ B60L 3/12 |
| WO | WO-2013146371 | A1 * | 10/2013 | ............. B25J 19/02 |
| WO | WO-2019013206 | A1 * | 1/2019 | ............ G01D 5/244 |

OTHER PUBLICATIONS

English Translation of JP 2010004695 A (Year: 2010).*
Oct. 30, 2018 International Search Report issued in International Patent Application No. PCT/JP2018/026034.
Jan. 14, 2020 International Preliminary Report on Patentability issued in International Patent Application No. PCT/JP2018/026034.
Jan. 1, 11, 2023 Office Action issued in Japanese Patent Application No. 2019-529731.
Jun. 6, 2022 Office Action issued in Japanese Patent Application No. 2019-529731.
Jun. 8, 2021 Office Action issued in Chinese Patent Application No. 201880046613.5.

* cited by examiner (A)

(B)

(A)

(B)

(A)

(B)

(A)

(B)

ENCODER AND DRIVE DEVICE

The contents of the following Japanese patent application are incorporated herein by references:
NO. 2017-137860 filed in JP on Jul. 14, 2017, and
NO. PCT/JP2018/026034 filed on Jul. 10, 2018.

BACKGROUND

1. Technical Field

The present invention relates to an encoder and a drive device which includes the encoder.

2. Related Art

An encoder (for example, a rotary encoder) is attached to a rotation shaft of a motor in order to control a rotation angle of the motor used for a drive unit of an industrial robot or a machine tool with a high accuracy. Then, the control of the motor is performed on the basis of a detection result of the encoder. The motor is generally covered with resin to emit heat from a coil. The resin absorbs moisture (humidity) in the air when the motor stops, and releases moisture in the resin during the operation. Therefore, the coil is rapidly increased in temperature during the operation of the motor, the resin of the motor also rises in temperature, the moisture contained in the resin is released into the air, and the emitted moisture flows even toward the encoder. At this time, since the encoder has not been heated yet, there is a concern about that the moisture may condense in the encoder. In order to prevent such condensation, it has been proposed to arrange a hygroscopic agent in the encoder (for example, see Patent Literature 1).

Recently, motors equipped with encoders have been used in more various environments, and there is also a demand for constantly maintaining the detection accuracy of the encoders with high accuracy. Therefore, there is a demand for more effective prevention of condensation or suppression of condensation in the encoder.

Patent Literature 1: Japanese Patent Application Publication No. 2017-15521

GENERAL DISCLOSURE

According to a first aspect of the invention, there is provided an encoder for detecting rotation information of a first rotation shaft. The encoder includes a first detector which detects a pattern provided in the first rotation shaft, a first housing case which houses the pattern provided in the first rotation shaft and the first detector, a second housing case which houses at least a part of a shaft portion different from a portion where the pattern is provided, of the first rotation shaft, and an adjusting mechanism which adjusts at least one of an atmospheric pressure and a temperature in the first housing case to be higher than at least one of an atmospheric pressure and a temperature in the second housing case.

According to a second aspect, there is provided a drive device which includes the encoder of the first aspect, a motor unit which drives the first rotation shaft, a control unit which controls the motor unit using a detection result of the encoder. According to a third aspect, there is provided a drive device which includes a first encoder which detects rotation information of a first rotation shaft, a first housing case which houses the first encoder, a motor unit which drives the first rotation shaft, a second housing case which houses the motor unit, and an adjusting mechanism which adjusts at least one of an atmospheric pressure and a temperature in the first housing case to be equal to at least one of an atmospheric pressure and a temperature in the second housing case until a temperature of the motor unit is saturated after the motor unit starts to operate, or adjusts at least one of the atmospheric pressure and the temperature in the first housing case to be higher than at least one of the atmospheric pressure and the temperature in the second housing case.

DESCRIPTION OF EXEMPLARY EMBODIMENTS

Figure 1:
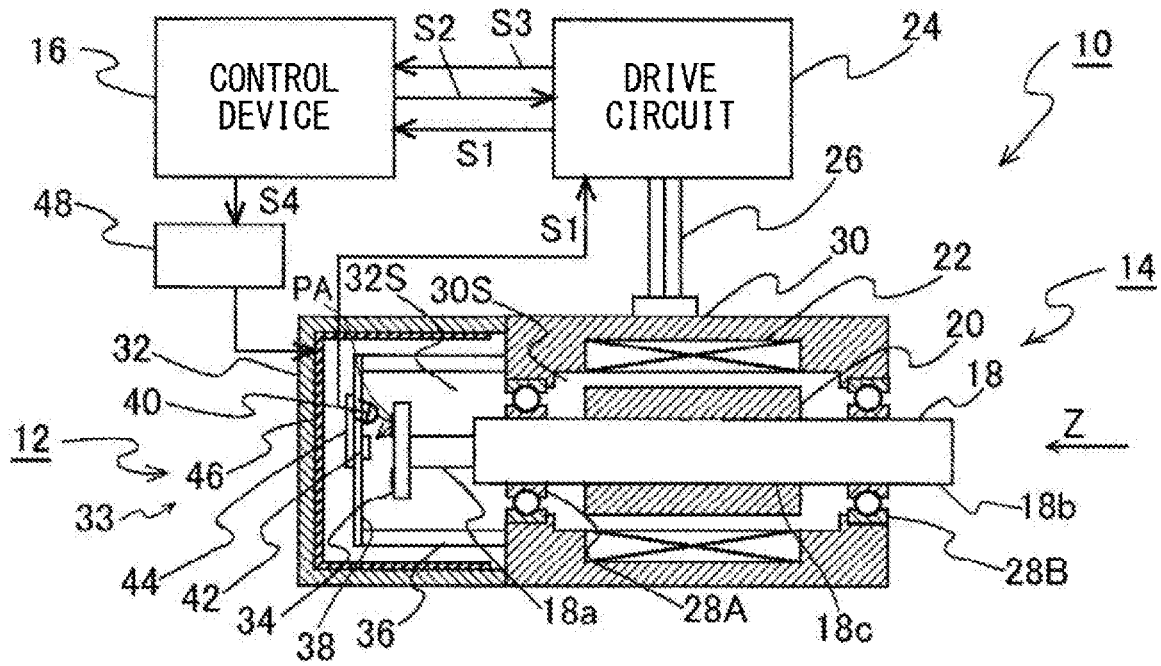
FIG. 1 shows cross-sectional views, in which (A) is a cross-sectional view illustrating a drive device according to a first embodiment of the invention, and (B) is a cross-sectional view illustrating a drive device of a first modification.
Figure 1:
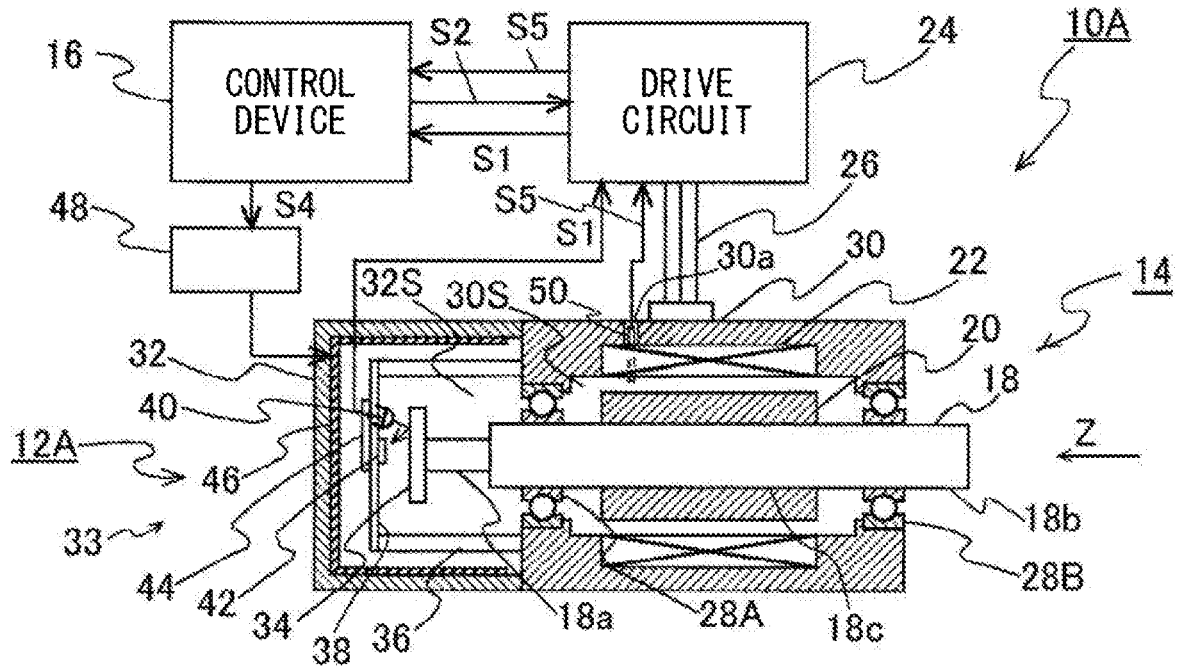

Hereinbelow, a first embodiment will be described with reference to (A) of FIG. 1. (A) of FIG. 1 shows a schematic configuration of a drive device 10 according to this embodiment. In (A) of FIG. 1, the drive device 10 includes an encoder unit 12, a motor unit 14, and a control device 16 which controls an operation of the motor unit 14 on the basis of a detection result of the encoder unit 12. The motor unit 14 includes a box-like motor case 30 with two openings facing each other formed, a pair of rotation bearings 28A and 28B which are provided in side surface portions (inside surfaces) of the two openings formed in the motor case 30, an elongated rod-shaped rotation shaft 18 which is rotatably supported through the pair of rotation bearings 28A and 28B, a plurality of magnets 20 which are mounted on an outer surface of a shaft portion 18c of the center of the rotation shaft 18, a plurality of coils 22 which are disposed in an inner surface of the motor case 30 to surround the magnets 20, and a drive circuit 24 which is connected to the coils 22 through a plurality of signal lines 26. At least a part of the magnet 20 and the coil 22 is covered by a resin (not illustrated) such as a synthetic resin. The resin absorbs moisture from the ambient air during stoppage of the motor unit 14. The resin releases the moisture into the ambient air during operation of the motor unit 14 (a period of supplying a current to the coil 22). The following description will be given, taking a Z axis parallel to the central axis of the rotation shaft 18. The rotation shaft 18 can rotate around an axis parallel to the Z axis.

As an example, the motor unit 14 is a three-phase AC motor, and a DC motor or the like may also be used as the motor unit 14. In this embodiment, a part of the shaft portion 18c of the rotation shaft 18, the magnet 20, and the coil 22 are housed in the motor case 30. On the other hand, one end portion 18a, which is narrower than the shaft portion 18c of the rotation shaft 18 and is disposed in a +Z direction, and the other end portion 18b, which has the same outer diameter as that of the shaft portion 18c and is disposed in a −Z direction, respectively protrude to the outside of the side surface of the +Z direction and the −Z direction of the motor case 30.

In addition, the encoder unit 12 is disposed on the one end portion side of the rotation shaft 18. The encoder unit 12 includes a detection unit 33 which includes a disk-like rotation plate 34 which is attached to a tip of the one end portion 18a of the rotation shaft 18 and is formed with a reflection-type pattern PA (hereinbelow, also referred to as a rotation-type detection pattern) for detecting a position in the rotation direction, a light source 40 which emits a detection light to the pattern PA of the rotation plate 34, a light-receiving element 42 which receives a reflection light from the pattern PA, and a processing circuit 44 which processes a detection signal of the light-receiving element 42 to obtain information (hereinbelow, referred to as encoder information) S1 of the position (an angle and/or an angular velocity) in the rotation direction of the rotation plate 34 (and the rotation shaft 18). The encoder information S1 is supplied to the drive circuit 24 and the control device 16. The rotation plate 34 may be also called a rotation-type scale or disk. Further, the detection pattern PA formed in the rotation plate 34 may be any pattern of an absolute type, an incremental type, or the like. In addition, the rotation plate 34 is of a reflection type, but a transmission-type pattern may be formed in the rotation plate 34.

The control device 16 generates rotation command information S2, which includes information such as a rotation angle of the rotation shaft 18, using information of a target rotation angle and/or a target rotation speed of the rotation shaft 18 and the encoder information S1, and supplies the rotation command information S2 to the drive circuit 24. The drive circuit 24 adjusts the current to be supplied to the coil 22 using the rotation command information S2 and the encoder information S1 so as to control the rotation angle and/or the rotation speed of the rotation shaft 18. Further, the drive circuit 24 supplies current information S3, which includes a current value to be supplied to the coil 22, to the control device 16.

A flat plate-like base plate 38 is supported to the end surface in the +Z direction of the motor case 30 through a plurality of supporting members 36. In the base plate 38, the light source 40, the light-receiving element 42, and the processing circuit 44 are attached. In addition, a box-like encoder case 32 is attached in an airtight state to the end surface in the +Z direction of the motor case 30 to cover (house) the one end portion 18a of the rotation shaft 18, the detection unit 33, the base plate 38, and the supporting member 36. Further, a sheet-like flexible heater 46 is provided in almost the entire inner surface of the encoder case 32. The heater 46 is configured, as an example, by interposing a sheet-like heat generator such as metal between two sheets made of an insulator with flexibility and heat resistance (for example, a silicone rubber or the like). The control device 16 supplies heating command information S4 indicating a heating amount to a power source unit 48. In response, the power source unit 48 controls the current to be supplied to the heater 46, so that the temperature of the heater 46 is controlled. The encoder unit 12 is configured to include the encoder case 32, the detection unit 33, the base plate 38, the heater 46, and the power source unit 48. In this embodiment, the encoder case 32 is adjacent to the motor case 30. A space 30S in the motor case 30 and a space 32S in the encoder case 32 communicate slightly with each other through a gap in the rotation bearing 28A. In addition, the space 32S communicates slightly with the external air through a gap in the rotation bearing 28B. Further, the motor case 30 and the encoder case 32 may be separated.

An example of the operation of the drive device 10 of this embodiment will be described. First, the processing circuit 44 of the encoder unit 12 supplies the encoder information S1 such as the angle of the rotation plate 34 (and the rotation shaft 18) obtained in a predetermined period to the drive circuit 24 and the control device 16. Then, the control device 16 supplies the rotation command information S2 generated using the encoder information S1 to the drive circuit 24 of the motor unit 14. In response, the drive circuit 24 controls the current value to be supplied to the coil 22. With this operation, the rotation angle of the rotation shaft 18, or the like is controlled to be a target value.

In addition, the drive circuit 24 supplies the current information S3 containing the current value to be supplied to the coil 22 to the control device 16 in a predetermined period. In advance, a value obtained by integrating the current flowing through the coil 22 of the motor unit 14 according to an elapsed time (an integrated value), a function indicating a relation with the temperature of the space 30S in the motor case 30 (hereinbelow, referred to as a first temperature function), a value obtained by integrating the current caused to flow through the heater 46 in the encoder case 32, and a function indicating a relation with the temperature of the space 32S in the encoder case 32 (hereinbelow, referred to as a second temperature function) are obtained. The first and second temperature functions are stored in a storage unit in the control device 16. The control device 16 obtains the value obtained by integrating the current flowing through the coil 22, using the current information S3 supplied from the drive circuit 24, and predicts a temperature T30 of the space 30S from the value and the temperature function. Then, the control device 16 supplies the heating command information S4 to the power source unit 48 such that a temperature T32 of the space 32S predicted using the second temperature function from the integrated value of the current (heating amount) flowing through the heater 46 becomes larger than the temperature T30, to control the heating amount of the heater 46.

With this configuration, the temperature of the space 32S in the encoder case 32 becomes higher than that of the space 30S in the motor case 30. The pressure in the space 32S becomes higher than that in the space 30S due to thermal expansion. Then, the gas (air) of the space 32S flows into the space 30S through the rotation bearing 28A, and the gas of the space 30S flows out to the outside (the external air) through the rotation bearing 28B. Therefore, even if water vapor is generated from the resin of the motor unit 14 during the operation of the motor unit 14, the air containing the water vapor (the high-humidity air) hardly flows into the encoder case 32, so that there is no concern about condensation in the encoder case 32. In addition, even if the high-humidity air flows slightly into the encoder case 32, the temperature of the space 30S in the encoder case 32 is increased by the heater 46, and the temperature of the surface of the component (the rotation plate 34, the light source 40, and the light-receiving element 42) of the detection unit 33 in the encoder case 32 becomes higher than the dew point, so that there is a lesser concern about condensation in the encoder case 32. Therefore, since the condensation does not occur in the encoder case 32 even when the motor unit 14 continuously operates, the rotation angle of the rotation plate 34 (the rotation shaft 18) can be detected always with a high accuracy by the encoder unit 12 and, with this detection result, the rotation of the rotation shaft 18 can be controlled with a high accuracy by the motor unit 14.

Further, in a case where the temperature of the surface of each component of the detection unit 33 in the encoder case 32 becomes higher than the dew point due to the operation of the motor unit 14, and it can be determined that the heater 46 does not need to be heated, the control device 16 may supply command information to the power source unit 48 to turn off the current to be supplied to the heater 46. In other words, a command information to supply the current to the heater 46 is supplied to the power source unit 48 until the temperature of a motor 46 settles at a certain temperature after power is turned on, or until the temperature of the motor 46 rises after the operation of the motor unit 14 starts and the temperature of the motor 46 is saturated (steady).

As described above, the encoder unit 12 which detects the rotation information (the encoder information S1) of the rotation shaft 18 of this embodiment includes the detection unit 33 (hereinbelow, also referred to as a first detector) which is disposed on the one end portion 18a side of the rotation shaft 18 and detects the pattern PA provided in the rotation shaft 18, the encoder case 32 (hereinbelow, also referred to as a first housing case) which houses the pattern PA and the detection unit 33, the motor case 30 (hereinbelow, also referred to as a second housing case) which houses at least a part of the shaft portion 18c different from the one end portion 18a of the rotation shaft 18, and the heater 46 as an adjusting mechanism which adjusts at least one of the temperature and the atmospheric pressure of the space in the encoder case 32 to be higher than at least one of the temperature and the atmospheric pressure of the space in the motor case 30.

According to the encoder unit 12, the air in the encoder case 32 is heated by the heater 46 to adjust the atmospheric pressure to be higher than the atmospheric pressure in the motor case 30, so that the high-humidity gas in the motor case 30 does not flow into the encoder case 32. In addition, the heating of the heater 46 can make the temperature of the surface of the detection unit 33 in the encoder case 32 higher than the dew point, so that the condensation in the encoder case 32 can be prevented. Therefore, the rotation information of the rotation shaft 18 can be detected always with a high accuracy by the encoder unit 12. In addition, the adjusting mechanism may adjust at least one of the temperature and the atmospheric pressure of the space in the encoder case 32 to be higher than at least one of the temperature and the atmospheric pressure of the space in the motor case 30 until the temperature of the motor unit 14 is saturated after the operation of the motor unit 14 starts.

Next, modifications and other embodiments of the above-described embodiment will be described. Further, in (B) of FIG. 1 to FIG. 7 which is referred to below, a portion corresponding to (A) of FIG. 1 will be attached with the same or similar symbol, and the detailed description thereof will be omitted. However, the pattern PA of (A) of FIG. 1 is omitted in (B) of FIG. 1 to FIG. 6. First, in the above-described embodiment, a reflection-type or transmission-type optical detector is used as the detection unit 33. Alternatively, a detector of a magnetic type, a capacitive type, or the like may be used as the detection unit. Further, the detection unit 33 includes the rotation plate 34, but may use the one end portion 18a of the rotation shaft 18, or the like as a rotation plate. In other words, a magnetization pattern or a reflection pattern indicating the position in the rotation direction is formed in the surface of the one end portion 18a, and the rotation information may be detected by the detection unit which includes a magnetic sensor or a light-receiving element. In addition, as an attaching position of the scale (the rotation plate 34), a position other than the one end portion 18a of the rotation shaft 18, for example, the other end portion 18b or a position separated from the one end portion 18a and the other end portion 18b may be used.

In addition, in the above-described embodiment, the heater 46 is provided in the inner surface of the encoder case 32. However, the sheet-like heater 46 may be attached to an outer surface of the encoder case 32, and increase the temperature of the air in the encoder case 32 from the outer surface. Further, instead of the heater 46, an infrared heater may be provided in the encoder case 32, and increase the temperature of the air in the encoder case 32 by the infrared heater. In addition, the infrared heater may be provided outside the encoder case 32, and increase the temperature of the encoder case 32 and the inner air from the outside.

In addition, the control device 16 may control the heating amount of the heater 46 such that the temperature of the space 32S and the temperature of the space 30S become substantially equal. The expression "substantially equal" means, for example, that these temperatures do not need to completely match as long as the gas does not intrude from the inside of the motor case 30 into the encoder case 32. With this configuration, it is possible to suppress that the gas of the space 30S flows into the space 32S through the bearing 28A.

In addition, in the above-described embodiment, the temperature of the space in the motor case 30 is predicted from the current to be supplied to the coil 22 of the motor unit 14. However, the temperature of the space in the motor case 30 may be directly measured by a temperature sensor 50 as illustrated in an encoder unit 12A of a drive device 10A of a first modification of (B) of FIG. 1. In (B) of FIG. 1, the temperature sensor 50 such as a thermistor, a thermocouple, or a platinum temperature measuring resistor is disposed in a through-hole 30a provided in the side surface of the motor case 30, and a temperature measuring portion of the temperature sensor 50 protrudes to the space 30S in the motor case 30. The surroundings of the through-hole 30a are sealed. In this modification, temperature information S5 containing the temperature of the gas of the space 30S measured by the temperature sensor 50 is supplied to the drive circuit 24 and the control device 16. In the control device 16, the heating command information S4 is output to the power source unit 48 such that the temperature of the space 32S in the encoder case 32 becomes higher than the temperature of the space 30S using the temperature information S5. Therefore, the temperature of the space 32S can be controlled to be higher than the temperature of the space 30S more accurately, and the condensation in the encoder case 32 can be prevented more securely.

Further, in this modification, a temperature sensor (not illustrated) may be provided to detect the temperature of the space 32S in the encoder case 32. With the use of a measurement result of the temperature sensor, the temperature of the space 32S can be controlled with a higher accuracy. In addition, as illustrated in an encoder unit 12B of a drive device 10B of a second modification of (A) of FIG. 2, the atmospheric pressure in the motor case 30 may be directly measured by a pressure gage 52A. In (A) of FIG. 2, the pressure gage 52A such as a semiconductor-type or strain gage-type pressure sensor is provided to cover the through-hole 30a provided in the side surface of the motor case 30. Atmospheric pressure information S6 containing the atmospheric pressure of the space 30S measured by the pressure gage 52A is supplied to the drive circuit 24 and the control device 16. In the control device 16, the heating command information S4 is output to the power source unit 48 such that the atmospheric pressure of the space 32S in the encoder case 32 becomes higher than the atmospheric pressure of the space 30S using the atmospheric pressure information S6. Therefore, the atmospheric pressure of the space 32S can be controlled to be higher than the atmospheric pressure of the space 30S more accurately. The inflow of the high-humidity air from the space 30S into the space 32S can be prevented more securely. The condensation in the encoder case 32 can be prevented more securely.

Further, in this modification, as illustrated with a dotted line, a pressure gage 52B may be provided to detect the atmospheric pressure of the space 32S to cover the through-hole 32a provided in the side surface of the encoder case 32. With the use of measurement results of the pressure gages 52A and 52B, the atmospheric pressure of the space 32S can be adjusted to be higher than the atmospheric pressure of the space 30S more securely. In addition, in a case where the atmospheric pressure of the environment where the motor case 30 and the encoder case 32 are provided is called an ambient pressure, and the temperature of the environment is called an ambient temperature in the first embodiment and the first and second modifications thereof, the control device 16 may respectively control the atmospheric pressure or the temperature of the space 32S in the encoder case 32 to be higher than the ambient pressure or the ambient temperature. Alternatively, the atmospheric pressure or the temperature of the space 32S may be respectively controlled to be higher than the atmospheric pressure or the temperature of the space 30S in the motor case 30.

Figure 2:
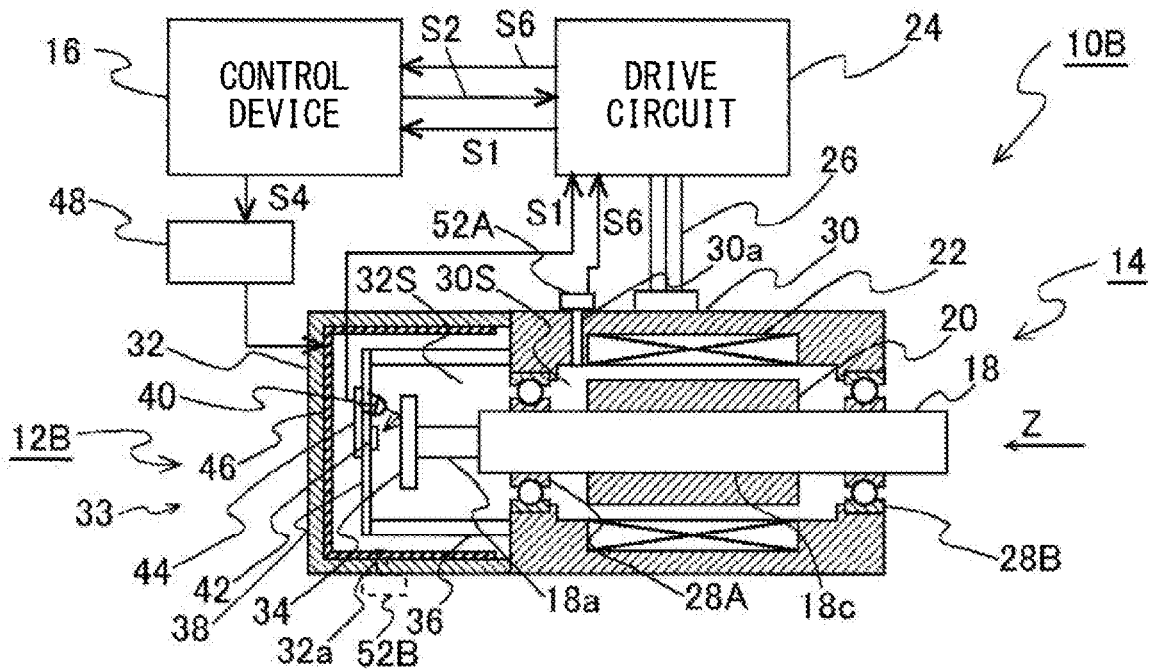
FIG. 2 shows cross-sectional views, in which (A) is a cross-sectional view illustrating a drive device of a second modification, and (B) is a cross-sectional view illustrating a drive device according to a second embodiment.
Figure 2:
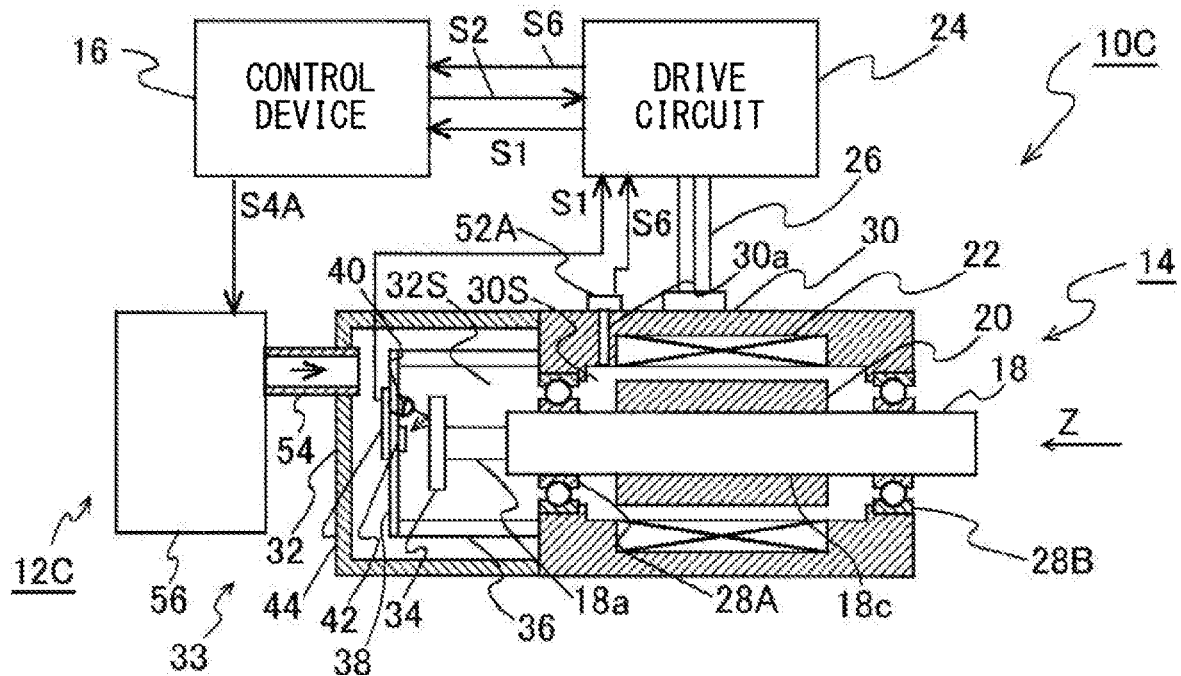

Next, a second embodiment will be described with reference to (B) of FIG. 2. In (B) of FIG. 2 illustrating a drive device 10C which includes an encoder unit 12C of this embodiment, the pressure gage 52A is provided in the side surface of the motor case 30 to measure the atmospheric pressure of the space 30S in the motor case 30, and the atmospheric pressure information S6 of the pressure gage 52A is supplied to the drive circuit 24 and the control device 16. In addition, a heater is not provided in the encoder case 32. Instead, there is provided a pressurizing device 56 which supplies gas (air, and an inert gas such as nitride) to the space 32S in the encoder case 32 through a pipe 54 to increase the atmospheric pressure of the space 32S. The control device 16 supplies, to the pressurizing device 56, pressurizing command information S4A containing information of a setting value of an atmospheric pressure higher than the atmospheric pressure of the space 30S which is included in the atmospheric pressure information S6. Then, the pressurizing device 56 supplies the gas to the space 32S such that the atmospheric pressure of the space 32S becomes higher than the atmospheric pressure of the space 30S.

The other configurations are similar to those of the first embodiment. According to this embodiment, the pressurizing device 56 is provided as an adjusting mechanism which adjusts the atmospheric pressure of the space 32S to be higher than the atmospheric pressure of the space 30S. Therefore, the inflow of the high-humidity air from the space 30S into the space 32S can be prevented more securely. The condensation in the encoder case 32 can be prevented more securely. Further, as illustrated in an encoder unit 12D of a drive device 10D of the modification of (A) of FIG. 3, the pressure gage 52B is provided in the side surface of the encoder case 32 to detect the atmospheric pressure of the space 32S, and atmospheric pressure information S6A containing the information of the atmospheric pressure of the space 32S which is measured by the pressure gage 52B may be supplied to the drive circuit 24 and the control device 16. Since the pressurizing device 56 is operated using the measurement results of the pressure gages 52A and 52B, the atmospheric pressure of the space 32S can be adjusted to be higher than the atmospheric pressure of the space 30S more securely. In addition, in the second embodiment and the modification described above, the control device 16 may respectively control the atmospheric pressure or the temperature of the space 32S in the encoder case 32 to be higher than the ambient pressure or the ambient temperature. Alternatively, the atmospheric pressure or the temperature of the space 32S may be respectively controlled to be higher than the atmospheric pressure or the temperature of the space 30S in the motor case 30.

Figure 3:
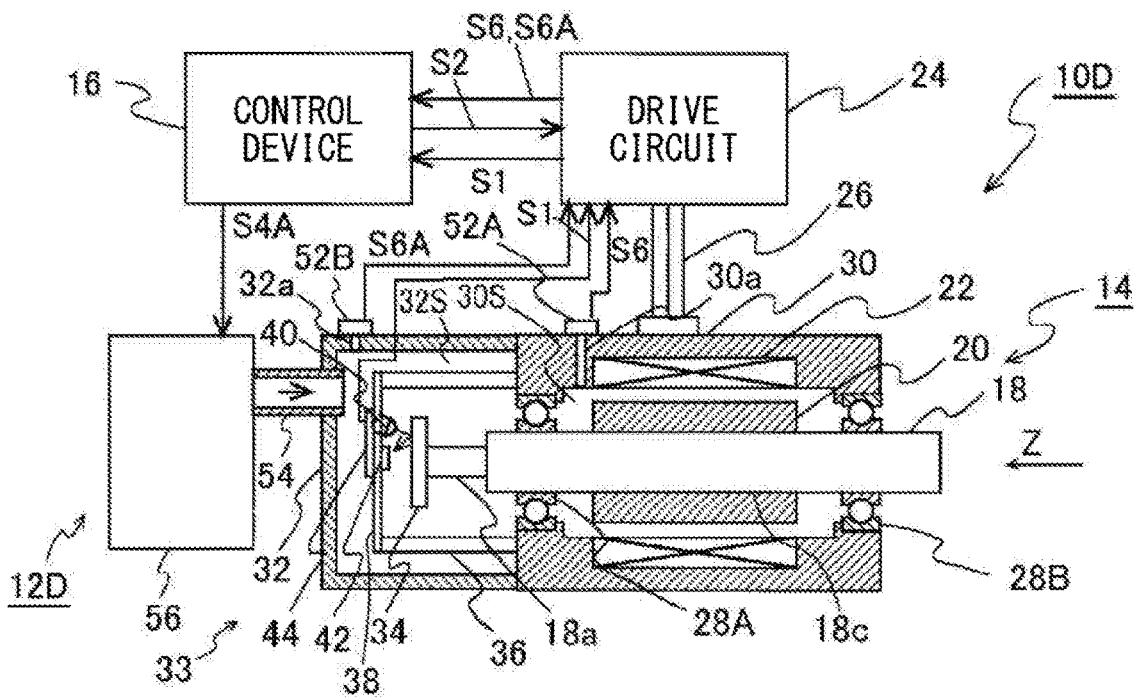
FIG. 3 shows cross-sectional views, in which (A) is a cross-sectional view illustrating a drive device of a modification of the second embodiment, and (B) is a cross-sectional view illustrating a drive device according to a third embodiment.
Figure 3:
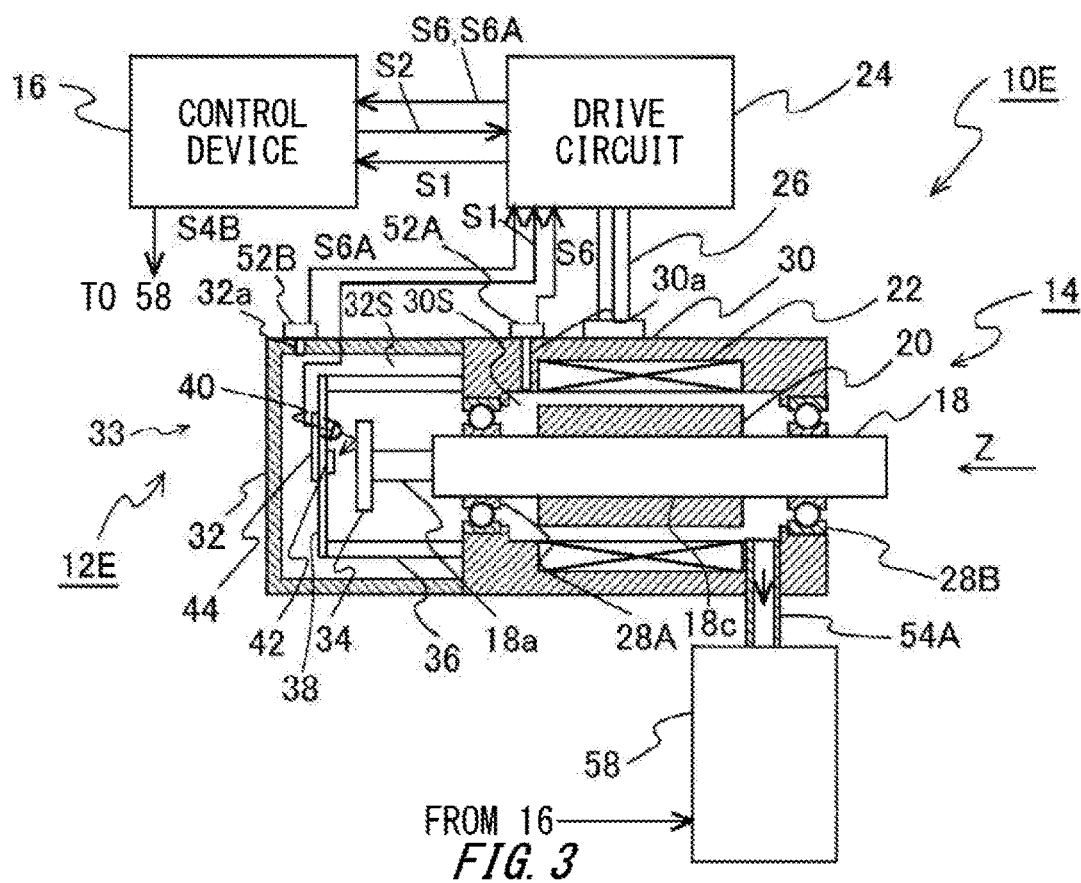

Next, a third embodiment will be described with reference to (B) of FIG. 3. In (B) of FIG. 3 illustrating a drive device 10E which includes an encoder unit 12E of this embodiment, the pressure gages 52A and 52B are respectively provided in the side surfaces of the motor case 30 and the encoder case 32 to measure the atmospheric pressures of the spaces 30S and 32S, and the atmospheric pressure information S6 and S6A of the pressure gages 52A and 52B is supplied to the drive circuit 24 and the control device 16. A depressurizing device 58 is provided which exhausts the air of the space 30S in the motor case 30 through a pipe 54A to lower the atmospheric pressure of the space 30S. The control device 16 supplies depressurizing command information S4B to the depressurizing device 58 to adjust the atmospheric pressure of the space 32S contained in the atmospheric pressure information S6A to be higher than the atmospheric pressure of the space 30S contained in the atmospheric pressure information S6. Then, the depressurizing device 58 exhausts the air of the space 30S such that the atmospheric pressure of the space 32S becomes higher than the atmospheric pressure of the space 30S.

The other configurations are similar to those of the second embodiment. According to this embodiment, the depressurizing device 58 is provided as an adjusting mechanism which adjusts the atmospheric pressure of the space 32S to be higher than the atmospheric pressure of the space 30S. Therefore, the inflow of the high-humidity air from the space 30S into the space 32S can be prevented more securely. The condensation in the encoder case 32 can be prevented more securely. Further, in this embodiment, the pressure gage 52B may also be omitted. Further, the adjusting mechanisms of the first to third embodiments described above may be jointly used. Further, in the second or third embodiment described above, the control device 16 may control a supplying amount of the air of the pressurizing device 56 or an exhausting amount of the air of the depressurizing device 58 such that the atmospheric pressure of the space 32S and the atmospheric pressure of the space 30S become substantially equal. The expression "substantially equal" means that these atmospheric pressures do not need to completely match as long as the gas does not intrude from the inside of the motor case 30 into the encoder case 32. With this configuration, it is possible to suppress that the gas of the space 30S flows into the space 32S through the bearing 28A.

Figure 4:
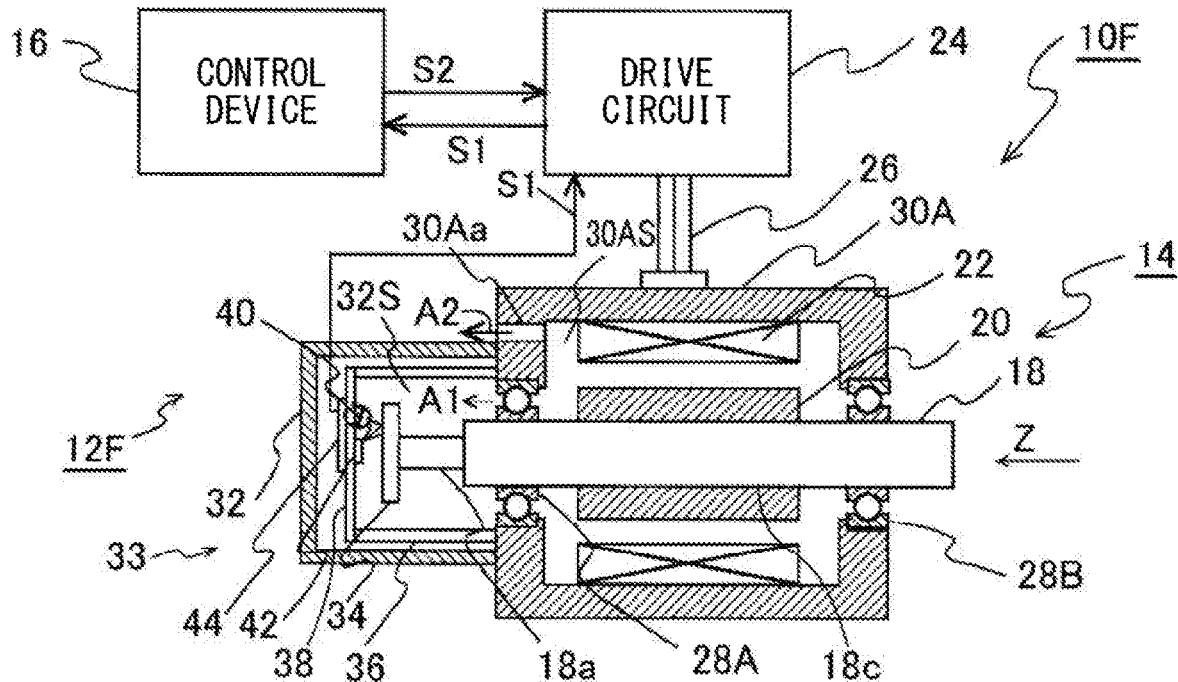
FIG. 4 shows cross-sectional views, in which (A) is a cross-sectional view illustrating a drive device according to a fourth embodiment, and (B) is a cross-sectional view illustrating a drive device of a modification thereof.
Figure 4:
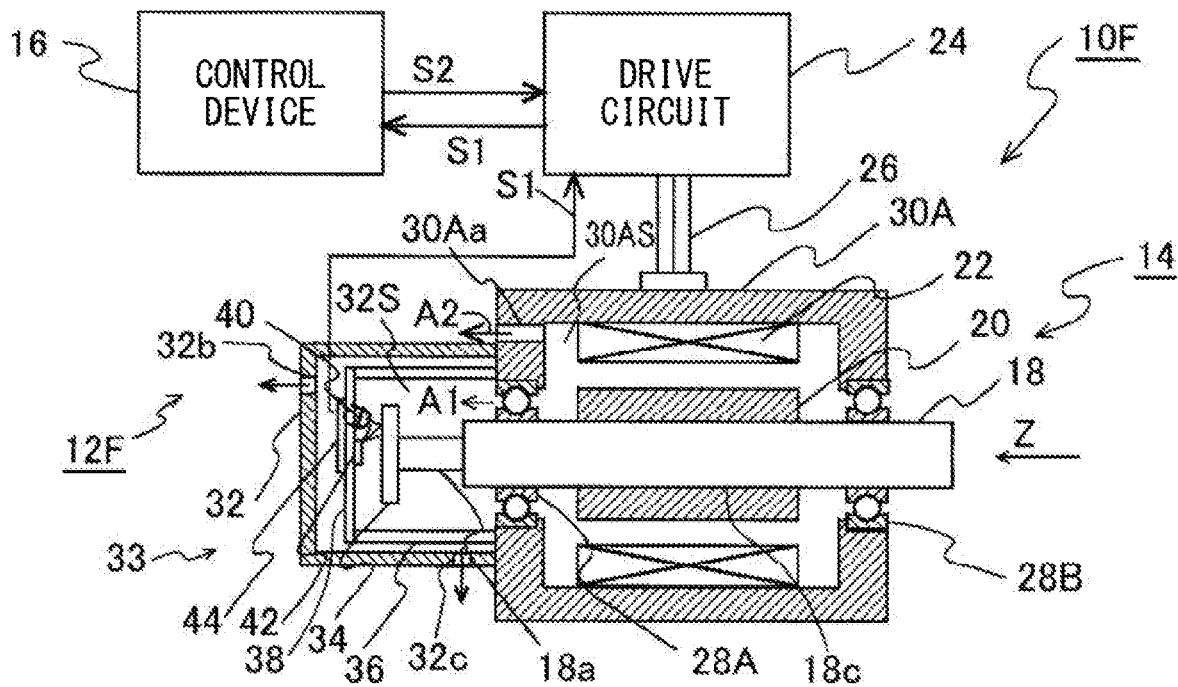

Next, a fourth embodiment will be described with reference to (A) of FIG. 4. In (A) of FIG. 4 illustrating a drive device 10F which includes an encoder unit 12F of this embodiment, a cross-sectional shape of a motor case 30A is formed to be larger than the cross-sectional shape of the encoder case 32. In addition, a heater is not provided in the encoder case 32, and the pressurizing device and the depressurizing device are not connected in the encoder case 32 and the motor case 30A.

In the end surface where the encoder case 32 of the motor case 30A of this embodiment is provided, an exhaust hole 30Aa is provided to cause the air of a space 30AS in the motor case 30A to flow out. In this case, as illustrated with arrow A1 from the space 30AS, the exhaust hole 30Aa is set to be large such that the amount of air flowing outside from the space 30AS through the discharging hole 30Aa as illustrated with arrow A2 is larger than the amount of air flowing into the space 32S through the rotation bearing 28A.

The other configurations are similar to those of the first embodiment. According to this embodiment, the exhaust hole 30Aa is provided as an adjusting mechanism which adjusts the atmospheric pressure of the space 32S to be higher than the atmospheric pressure of the space 30AS. Therefore, the inflow amount of high-humidity air from the space 30AS into the space 32S becomes less, and the condensation in the encoder case 32 can be suppressed with a simple configuration. Further, in this embodiment, the exhaust hole 30Aa may be provided in plural places of the motor case 30A.

Further, in this embodiment, the adjusting mechanisms of the first to third embodiments described above may be jointly used. In other words, a heater may be provided in the encoder case 32, and the pressurizing device may be connected to the encoder case 32. Alternatively, a heater may be provided in the encoder case 32, and the depressurizing device may be connected to the motor case 30A. Alternatively, the pressurizing device may be connected to the encoder case 32, and the depressurizing device may be connected to the motor case 30A. In addition, as illustrated in the modification of (B) of FIG. 4, a plurality (or one) of exhaust holes 32b and 32c may be provided in the side surface of the encoder case 32 to discharge the air of the space 32S to the outside. The sum of areas of the cross-sectional shapes of the exhaust holes 32b and 32c is set to be less than the area of the cross-sectional shape of the exhaust hole 30Aa as an example, and the amount of gas flowing out from the exhaust holes 32b and 32c is less than the amount of gas flowing out from the exhaust hole 30Aa. In this modification, the high-humidity air flowing from the space 30AS into a space 32AS through the rotation bearing 28A is exhausted outside from the exhaust holes 32b and 32c. Therefore, the condensation in the encoder case 32 can be prevented more securely.

Figure 5:
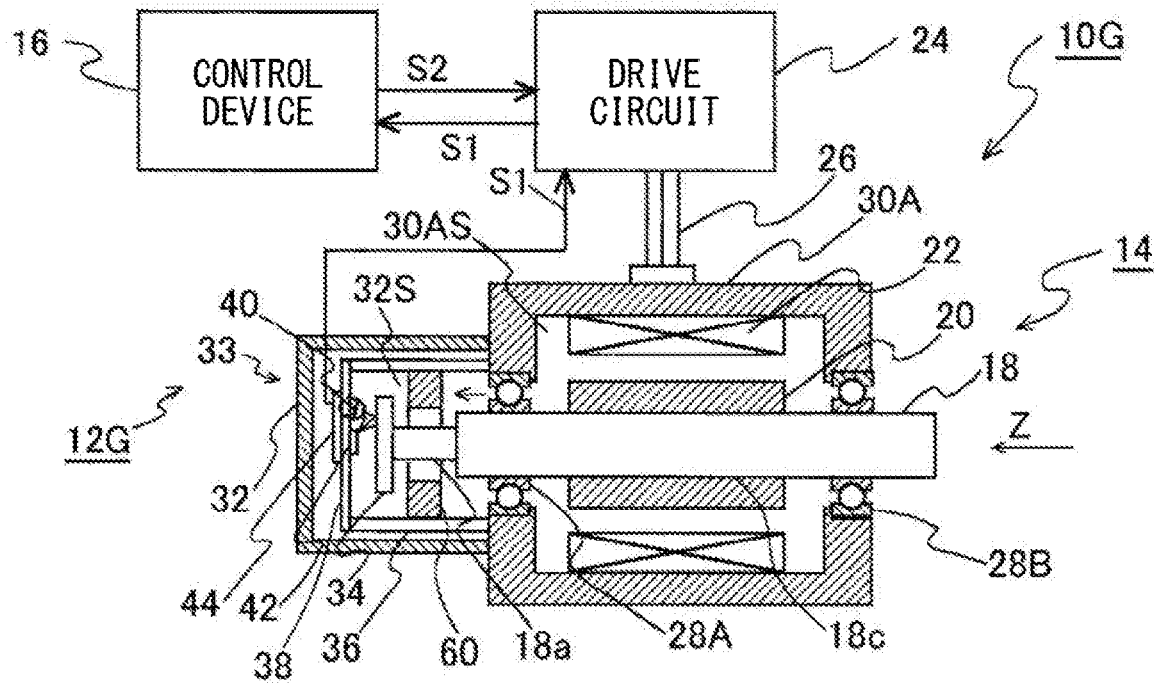
FIG. 5 shows cross-sectional views, in which (A) is a cross-sectional view illustrating a drive device according to a fifth embodiment, and (B) is a cross-sectional view illustrating a drive device according to a sixth embodiment.
Figure 5:
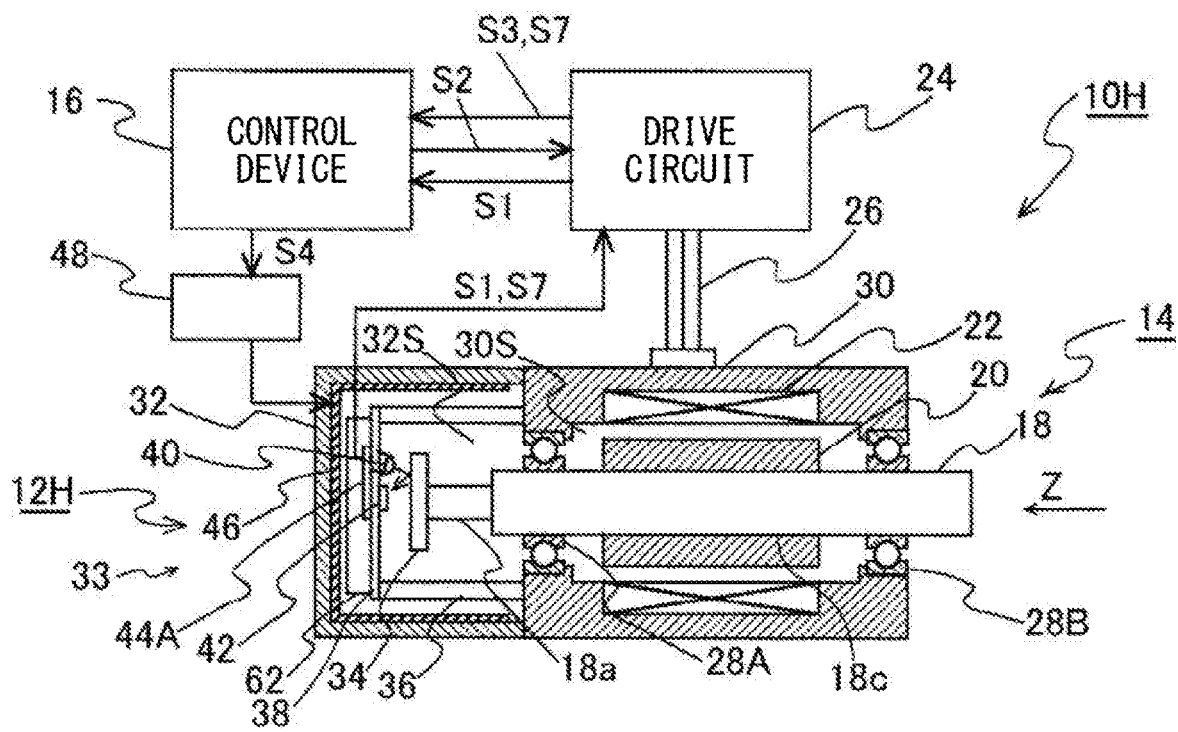

Next, a fifth embodiment will be described with reference to (A) of FIG. 5. In (A) of FIG. 5 illustrating a drive device 10G which includes an encoder unit 12G of this embodiment, the motor case 30A is not provided with an exhaust hole. In addition, a cylindrical metal cooling member 60 is disposed in the encoder case 32 to surround a region near the rotation plate 34 of the one end portion 18a of the rotation shaft 18, and the cooling member 60 is supported to the supporting member 36. A thermal capacity of the cooling member 60 is set to be larger than the thermal capacity of the rotation plate 34. The other configurations are similar to those of the fourth embodiment.

According to the encoder unit 12G of this embodiment, even if the temperature of the rotation plate 34 (the scale) in the encoder case 32 rises by a predetermined temperature due to an influence of heating caused by energization to the coil 22 of the motor unit 14, the temperature of the cooling member 60 does not rise as much as the predetermined temperature. Therefore, in a case where the high-humidity air flows from the space 30AS in the motor case 30A into the space 32S in the encoder case 32, dew forms on the surface of the cooling member 60 having a lower temperature when the air passes through the space between the cooling member 60 and the one end portion 18a of the rotation shaft 18, and the condensation on the surface of the rotation plate 34 is suppressed. Therefore, the rotation information of the rotation shaft 18 can be detected by the encoder unit 12G with a high accuracy. Even in this embodiment, the adjusting mechanisms of the first to fourth embodiments described above may be jointly used.

Next, a sixth embodiment will be described with reference to (B) of FIG. 5. In (B) of FIG. 5 illustrating a drive device 10H which includes an encoder unit 12H of this embodiment, a desiccant 62 is provided in the base plate 38 in the encoder case 32. Then, a processing circuit 44A of the detection unit 33 obtains information S7 indicating the absorbed amount of humidity (moisture) of the desiccant 62, for example, by measuring a resistance value of the desiccant 62, and supplies the information S7 to the drive circuit 24 and the control device 16. The other configurations are similar to those of the first embodiment.

According to the encoder unit 12H of this embodiment, the condensation in the encoder case 32 can be prevented in a period when the desiccant 62 absorbs humidity efficiently. In addition, the control device 16 determines whether the absorbing operation of the humidity of the desiccant 62 is lowered from an allowable range from the information S7 indicating the absorbed amount of the humidity of the desiccant 62. Then, when the absorbing operation of the humidity of the desiccant 62 is lowered from the allowable range, the control device 16 supplies the heating command information S4 to the power source unit 48, heats the heater 46 in the encoder case 32, and suppresses the inflow of the high-humidity air from the space 30S in the motor case 30 into the space 32S in the encoder case 32. With this configuration, the condensation in the encoder case 32 can be prevented even if the absorbing operation of the desiccant 62 is lowered.

In addition, in the sixth embodiment described above, the control device 16 may respectively control the atmospheric pressure or the temperature of the space 32S in the encoder case 32 to be higher than the ambient pressure or the ambient temperature. Alternatively, the atmospheric pressure or the temperature of the space 32S may be respectively controlled to be higher than the atmospheric pressure or the temperature of the space 30S in the motor case 30. Even in this embodiment, the adjusting mechanisms of the first to fourth embodiments described above may be jointly used. Further, the desiccant 62 of this embodiment may be jointly used in the first to fifth embodiments described above.

Figure 6:
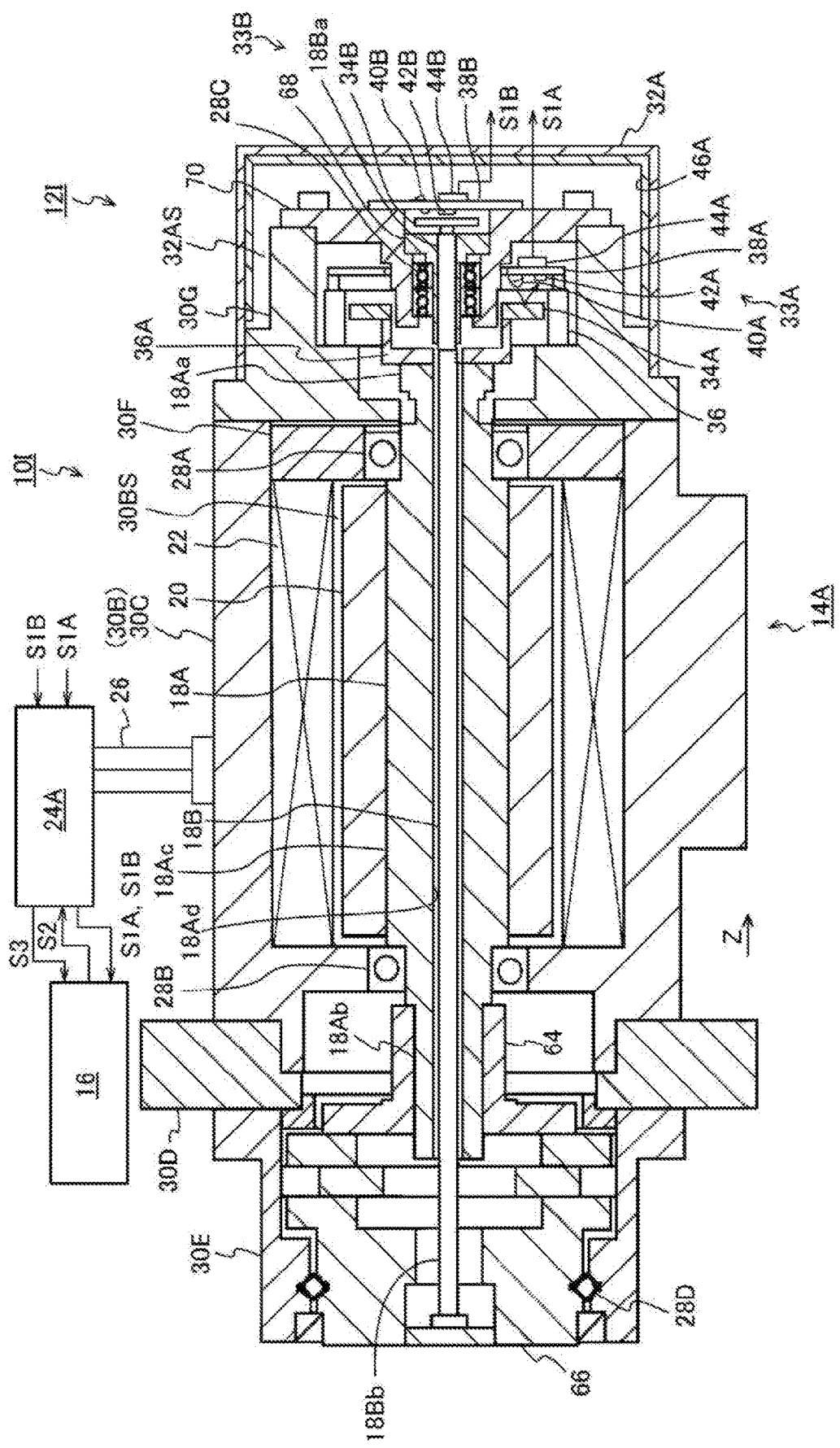
FIG. 6 is a cross-sectional view illustrating a drive device according to a seventh embodiment.

Next, a seventh embodiment will be described with reference to FIG. 6. In FIG. 6 illustrating the schematic configuration of a drive device 10I according to this embodiment, the drive device 10I includes a so-called double encoder-type encoder unit 12I, a motor unit 14A, and the control device 16 which controls the operation of the motor unit 14A on the basis of a detection result of the encoder unit 12I. In addition, a fixed plate 30F is fixed to cover the end portion in the +Z direction of a box-like case 30C. In the fixed plate 30F and the case 30C, an elongated rod-shaped first rotation shaft 18A, in which a through-hole 18Ac is formed, is rotatably supported through the pair of rotation bearings 28A and 28B. Further, in the first rotation shaft 18A, there is disposed a rod-shaped second rotation shaft 18B more elongated than the first rotation shaft 18.

In addition, the end portion in the −Z direction of the case 30C is fixed to a flange portion 30D, and a speed reducer 66 (a speed conversion portion or a transmission unit) is disposed in the surface in the −Z direction of the flange portion 30D through a cylindrical supporting member 30E and a rotation bearing 28D. A first rotation plate 34A formed with a reflection-type and rotation-type detection pattern is attached to a supporting member 36A provided in a tip of one end portion 18Aa of the first rotation shaft 18A. A second rotation plate 34B formed with a reflection-type and rotation-type detection pattern is attached to one end portion 18Ba of the second rotation shaft 18B. An input shaft of the speed reducer 66 is connected to the other end portion 18Ab of the first rotation shaft 18A, and an output shaft of the speed reducer 66 is connected to the other end portion 18Bb of the second rotation shaft 18B. As an example, the speed reducer 66 lowers the number of times of rotation of the first rotation shaft 18A to about 1/300, and transfers the rotation to the second rotation shaft 18B. A motor case 30B is configured by the case 30C, the fixed plate 30F, the flange portion 30D, and the supporting member 30E.

The motor unit 14A of this embodiment includes the first and second rotation shafts 18A and 18B, the magnet 20 which is mounted on an outer surface of the shaft portion 18Ac of the center of the first rotation shaft 18A, the coil 22 which is disposed on an inner surface of the case 30C to surround the magnet 20, and a drive circuit 24A which is connected to the coil 22 through the plurality of signal lines 26. The rotation shafts 18A and 18B are respectively rotatable about an axis parallel to the Z axis.

A cylindrical stepped supporting member 30G is fixed to the end portion in the +Z direction of the case 30C. The one end portion 18Ba of the second rotation shaft 18B is supported to an inner surface of an attachment member 70, which is fixed to the surface in the +Z direction of the supporting member 30G, through a rotation bearing 28C. A base plate 38A is supported to an inner surface of the supporting member 30G through the supporting member 36. A base plate 38B is supported to the surface in the +Z direction of the attachment member 70.

The encoder unit 12I includes the first rotation plate 34A, a first detection unit 33A which includes a light source 40A, a light-receiving element 42A, and the processing circuit 44A to detect encoder information S1A of the first rotation plate 34A, the second rotation plate 34B, and a second detection unit 33B which includes a light source 40B, a light-receiving element 42B, and a processing circuit 44B to detect encoder information S1B of the second rotation plate 34B. The detection units 33A and 33B are attached to the base plates 38A and 38B. The encoder information S1A and S1B is supplied to the drive circuit 24A and the control device 16.

In addition, a cylindrical encoder case 32A is attached in an airtight state to the surface in the +Z direction of the supporting member 30G to cover (house) the one end portions 18Aa and 18Ba of the rotation shafts 18A and 18B, the detection units 33A and 33B, the base plates 38A and 38B, and the supporting member 36. Further, a sheet-like flexible heater 46A is provided almost in the entire surface of an inner surface of the encoder case 32A. The control device 16 supplies the heating command information indicating a heating amount to the power source unit (not illustrated). In response, the power source unit controls the current to be supplied to the heater 46A, so that the temperature of the heater 46A is controlled. The other configurations are similar to those of the first embodiment.

According to the drive device 10I of this embodiment, the encoder unit 12I supplies the encoder information S1A and S1B of the rotation plates 34A and 34B (the rotation shafts 18A and 18B) to the drive circuit 24A and the control device 16. Then, the control device 16 supplies the rotation command information S2 generated using the encoder information S1A and S1B to the drive circuit 24A of the motor unit 14A. In response, the drive circuit 24A controls the current value to be supplied to the coil 22. With this operation, the rotation angle of the second rotation shaft 18B is controlled to be a target value.

In addition, the drive circuit 24A supplies the current information S3 containing the current value to be supplied to the coil 22 to the control device 16. The control device 16 controls the heating amount of the heater 46A using the current information S3 such that the temperature of the space 32AS in the encoder case 32A becomes higher than the temperature of a space 30BS in the motor case 30B. Then, the atmospheric pressure in the space 32AS becomes higher than the atmospheric pressure in the space 30BS due to the thermal expansion of the air in the spaces 32AS and 30BS. Therefore, even if water vapor is generated from the resin of the motor unit 14A during the operation of the motor unit 14A, the air containing the water vapor (the high-humidity air) hardly flows into the encoder case 32A, so that the similar effect as the first embodiment described above is obtained.

Further, in this embodiment, as an adjusting mechanism which adjusts the atmospheric pressure in the space 32AS to be higher than the atmospheric pressure in the space 30BS, the adjusting mechanisms of the second to fifth embodiments described above may be jointly used. In addition, the atmospheric pressure in the space 32AS is set to be higher than the ambient pressure of the drive device 10I in a state that the atmospheric pressure in the space 32AS is set to be higher than the atmospheric pressure in the space 30BS, so that the inflow of the air through a gap between the first rotation shaft 18A and the second rotation shaft 18B can also be suppressed. In addition, in this embodiment, the control device 16 may respectively control the atmospheric pressure or the temperature of the space in the encoder case 32A to be higher than the ambient pressure or the ambient temperature. Alternatively, the atmospheric pressure or the temperature of the space in the encoder case 32A may be respectively controlled to be higher than the atmospheric pressure or the temperature of the space in the motor case 30B.

Figure 7:
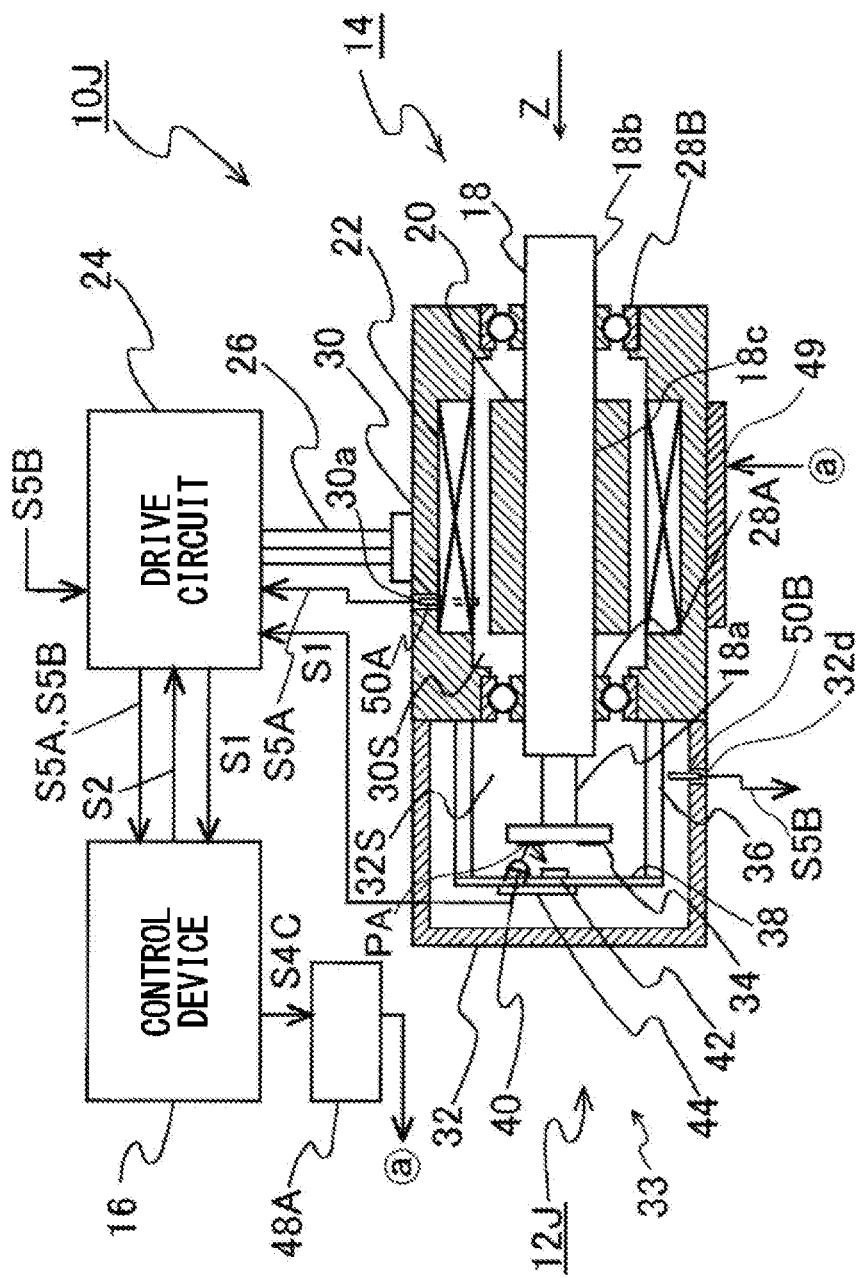
FIG. 7 is a cross-sectional view illustrating a drive device according to an eighth embodiment.

Next, an eighth embodiment will be described with reference to FIG. 7. In FIG. 7 illustrating a drive device 10J which includes an encoder unit 12J of this embodiment, a temperature sensor 50A is provided in the through-hole 30a of the side surface of the motor case 30 to measure the temperature of the space 30S in the motor case 30, and a temperature sensor 50B is provided in a through-hole 32d of the side surface of the encoder case 32 to measure the temperature of the space 32S in the encoder case 32. Temperature information S5A and S5B containing the temperatures of the air of the spaces 30S and 32S measured by the temperature sensors 50A and 50B is supplied to the drive circuit 24 and the control device 16.

In addition, in this embodiment, a heater is not provided in the encoder case 32, but a cooling element 49 is provided in an outer surface of the motor case 30 to cool down the motor case 30. As the cooling element 49, for example, a Peltier element, or a mechanism for circulating a cooled liquid through a pipe provided in the side surface of the motor case 30 may be used. The control device 16 supplies heat-absorbing command information S4C indicating a heat absorbing amount to a power source unit 48A. In response, the power source unit 48A controls the current to be supplied to the cooling element 49, so that the temperature of the space 30S in the motor case 30 with the cooling element 49 mounted is controlled. The other configurations are similar to those of the embodiment of (B) of FIG. 1.

In this embodiment, the control device 16 uses the temperature sensors 50A and 50B and the cooling element 49 (the adjusting mechanism) to lower the temperature of the motor case 30 such that, as an example, the temperature of the space 32S in the encoder case 32 becomes higher than the temperature of the space 30S in the motor case 30 using the temperature information of the spaces 30S and 32S measured by the temperature sensors 50A and 50B. At this time, the atmospheric pressure of the space 32S becomes higher than the atmospheric pressure of the space 30S. The inflow of the high-humidity from the space 30S into the space 32S can be prevented. The condensation in the encoder case 32 can be prevented.

Further, in this embodiment, the control device 16 may control the heat absorbing amount of the cooling element 49 such that the temperature of the space 32S and the temperature of the space 30S become substantially equal. The expression "substantially equal" means, for example, that these temperatures do not need to completely match as long as the gas does not intrude from the inside of the motor case 30 into the encoder case 32. With this configuration, it is possible to suppress that the gas of the space 30S flows into the space 32S through the bearing 28A.

In addition, in this embodiment, the control device 16 may respectively control the atmospheric pressure or the temperature of the space 32S in the encoder case 32 to be higher than the ambient pressure or the ambient temperature. Alternatively, the atmospheric pressure or the temperature of the space 32S may be respectively controlled to be higher than the atmospheric pressure or the temperature of the space 30S in the motor case 30. In addition, in this embodiment, the adjusting mechanisms of the atmospheric pressure or the temperature of the first to seventh embodiments described above may be jointly used. Further, the drive devices 10 to 10J of the embodiments and the modifications described above may be used as various machine tools or drive mechanisms of robot devices.

What is claimed is:

1. An encoder for detecting rotation information of a first rotation shaft, the encoder comprising:
a first detector which detects a pattern provided in the first rotation shaft;
a first housing case which houses the pattern provided in the first rotation shaft and the first detector;
a second housing case which houses at least a part of a shaft portion different from a portion where the pattern is provided, of the first rotation shaft; and
an adjusting mechanism which adjusts at least one of an atmospheric pressure and an ambient temperature in the first housing case to be higher than at least one of an atmospheric pressure and an ambient temperature in the second housing case.

2. The encoder according to claim 1,
wherein, based on at least one of the atmospheric pressure and the ambient temperature in the second housing case, the adjusting mechanism adjusts at least one of the atmospheric pressure and the ambient temperature in the first housing case.

3. The encoder according to claim 1,
wherein the adjusting mechanism includes a heating unit which heats a gas in the first housing case.

4. The encoder according to claim 3,
wherein the heating unit is provided in the first housing case.

5. The encoder according to claim 3, wherein
the adjusting mechanism includes a temperature sensor which detects a temperature of a gas in the second housing case, and
the heating unit adjusts a heating amount using a detection result of the temperature sensor.

6. The encoder according to claim 3, wherein
the adjusting mechanism includes a pressure sensor which detects the atmospheric pressure in the second housing case, and
the heating unit adjusts a heating amount using a detection result of the pressure sensor.

7. The encoder according to claim 1,
wherein, based on one of the atmospheric pressure in the first housing case and the atmospheric pressure in the second housing case, the adjusting mechanism adjusts the other one of the atmospheric pressure in the first housing case and the atmospheric pressure in the second housing case.

8. The encoder according to claim 7,
wherein the adjusting mechanism includes a pressurizing unit which supplies a gas into the first housing case, and pressurizes an inside of the first housing case.

9. The encoder according to claim 8, wherein
the adjusting mechanism includes a first pressure sensor and a second pressure sensor which detect the atmospheric pressures in the first and second housing cases respectively, and
the pressurizing unit adjusts a supplying amount of the gas using detection results of the first and second pressure sensors.

10. The encoder according to claim 7, wherein
the adjusting mechanism includes a depressurizing unit which exhausts a gas in the second housing case and a first pressure sensor and a second pressure sensor which detect the atmospheric pressures in the first and second housing cases respectively, and
the depressurizing unit adjusts an exhausting amount of the gas using detection results of the first and second pressure sensors.

11. The encoder according to claim 1,
wherein the adjusting mechanism includes a ventilation hole which is provided in the second housing case and can exhaust a gas in the second housing case.

12. The encoder according to claim 1, wherein
the first detector includes a scale which is attached to one end portion of the first rotation shaft, and a displacement detection unit which detects a displacement of the scale,
the pattern is formed in the scale, and
the adjusting mechanism includes a cooling unit which is provided in the first housing case and has a thermal capacity larger than the scale.

13. The encoder according to claim 1, wherein
a second rotation shaft is inserted to a hollow portion which is formed in the first rotation shaft,
the encoder includes a second detector to detect a pattern which is provided in the second rotation shaft, and
the first housing case houses the pattern provided in the second rotation shaft and the second detector.

14. A drive device comprising:
the encoder according to claim 1;
a motor unit which drives the first rotation shaft; and
a control unit which controls the motor unit using a detection result of the encoder,
wherein the second housing case houses the motor unit.

15. A drive device comprising:
the encoder according to claim 13;
a motor unit which drives the first rotation shaft;
a transmission unit which connects an end portion of the first rotation shaft and an end portion of a second rotation shaft, and transmits a rotation of the first rotation shaft to the second rotation shaft; and
a control unit which controls the motor unit using a detection result of the encoder,
wherein the second housing case houses the motor unit.

16. A drive device comprising:
a first encoder which detects rotation information of a first rotation shaft;
a first housing case which houses the first encoder;
a motor unit which drives the first rotation shaft;
a second housing case which houses the motor unit; and
an adjusting mechanism which adjusts at least one of an atmospheric pressure and an ambient temperature in the first housing case to be equal to at least one of an atmospheric pressure and an ambient temperature in the second housing case until a temperature of the motor unit is saturated after the motor unit starts to operate, or adjusts at least one of the atmospheric pressure and the ambient temperature in the first housing case to be higher than at least one of the atmospheric pressure and the ambient temperature in the second housing case.

17. The drive device according to claim 16,
wherein, based on at least one of the atmospheric pressure and the ambient temperature in the second housing case, the adjusting mechanism adjusts at least one of the atmospheric pressure and the ambient temperature in the first housing case.

18. The drive device according to claim 16,
wherein the adjusting mechanism includes a heating unit which heats a gas in the first housing case.

19. The drive device according to claim 18,
wherein the heating unit is provided in the first housing case.

20. The drive device according to claim 18, wherein
the adjusting mechanism includes a temperature sensor which detects a temperature of a gas in the second housing case, and
the heating unit adjusts a heating amount using a detection result of the temperature sensor.

21. The drive device according to claim 18, wherein
the adjusting mechanism includes a pressure sensor which detects the atmospheric pressure in the second housing case, and
the heating unit adjusts a heating amount using a detection result of the pressure sensor.

22. The drive device according to claim 17,
wherein the adjusting mechanism includes a pressurizing unit which supplies a gas into the first housing case, and pressurizes an inside of the first housing case.

23. The drive device according to claim 22, wherein
the adjusting mechanism includes a first pressure sensor and a second pressure sensor which detect the atmospheric pressures in the first and second housing cases respectively, and
the pressurizing unit adjusts a supplying amount of the gas using detection results of the first and second pressure sensors.

* * * * *